United States Patent [19]
Heer et al.

[11] Patent Number: 5,999,629
[45] Date of Patent: *Dec. 7, 1999

[54] DATA ENCRYPTION SECURITY MODULE

[75] Inventors: Daniel Nelson Heer, Newton, N.H.; David P. Maher, Largo, Fla.

[73] Assignee: Lucent Technologies Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/550,910

[22] Filed: Oct. 31, 1995

[51] Int. Cl.⁶ .............................. H04L 9/00; H04K 1/00
[52] U.S. Cl. ................................. 380/49; 380/4; 380/21; 380/25
[58] Field of Search ............................... 380/21, 23, 25, 380/30, 49, 4

[56] References Cited

U.S. PATENT DOCUMENTS

| | | | |
|---|---|---|---|
| 4,529,870 | 7/1985 | Chaum | 235/380 |
| 5,124,117 | 6/1992 | Tatebayashi et al. | 380/21 |
| 5,142,578 | 8/1992 | Matyas et al. | 380/21 |
| 5,228,084 | 7/1993 | Johnson et al. | 380/23 |
| 5,384,850 | 1/1995 | Johnson et al. | 380/52 |
| 5,416,842 | 5/1995 | Aziz | 380/30 |
| 5,448,638 | 9/1995 | Johnson et al. | 380/23 |
| 5,588,060 | 12/1996 | Aziz | 380/30 |
| 5,633,933 | 5/1997 | Aziz | 380/30 |
| 5,668,877 | 9/1997 | Aziz | 380/30 |

*Primary Examiner*—Gail O. Hayes
*Assistant Examiner*—Hrayr A. Sayadian
*Attorney, Agent, or Firm*—Frederick B. Luludis

[57] ABSTRACT

We have recognized that there is a strong need to control and maintain the secrecy of the intelligence that may be used by computers to communicate with another, for example, by encrypting the messages that they exchange with one another. Thus, the encryption keys used to encrypt such messages need to be managed in a highly secure manner. Accordingly, we provide an encryption module, which, in accord with an aspect of the invention, generates a unique device encryption key ($S_{local}$), a cryptographic key formed from a unique identification key ($S_{id}$) and an associated public key ($KP_{id}$), and at least one program encryption key, in which the public key is generated as a function of the unique identification key. The module then encrypts the unique identification key and program encryption key using said device encryption key and stores the encrypted result in memory internal to security module, thereby securing the keys against misappropriation. In addition, the module provides a mechanism for using the program encryption key to encrypt information that it receives from an external source and store the encrypted information in memory external to the security module, and responsive to receiving from a requester a request for the program encryption key, encrypting the program encryption key, in accord with an aspect of the invention, using a symmetrical encryption key generated as a function of a public key generated by a security module associated with the requester. The former security module then supplies the encrypted program encryption key to the requester.

14 Claims, 4 Drawing Sheets

DATA ENCRYPTION SECURITY MODULE

FIELD OF THE INVENTION

The invention relates to the encryption of data using unique encryption keys and more particularly relates to a security module which generates and manages such keys to prevent misappropriation thereof.

BACKGROUND OF THE INVENTION

It is well-known that data may be encrypted before it is either transmitted to a user or stored in memory to prevent unauthorized access to the unencrypted data. For example, cable-TV systems and direct broadcast satellite video systems typically encrypt video signals before the signals are transmitted to a user. A so-called set-top box associated with the user decrypts the signals as they are received from the service provider and supplies the decrypted signals to an associated video monitor for display when the monitor is tuned to the channel carrying the video signals. The capability to decrypt such signals is typically embodied in a decryption module disposed in the set-top box, and may be, for example, an integrated circuit or a so-called smart card which "plug" into the set-top box. The decryption key that is used to decrypt video signals characterizing a particular video program is typically supplied by the provider of the video signals in a well-known manner, e.g., via satellite or telephone line.

It is also well-known that a person may use any one of a number of different illicit means to obtain such a key to view a program that has been encrypted by the program provider. Such means include so-called video "pirates" who design and market smart cards that are able to illicitly produce a service provider's decryption key, thereby allowing a person to fraudulently access an encrypted video program. Present estimates indicate that such fraudulent access costs video program providers more than six billion dollars a year in lost revenue, and such losses are expected to increase as more programming is provided via satellite and cable TV network.

SUMMARY OF THE INVENTION

We have recognized that there is a strong need to control and maintain the secrecy of the intelligence that computers communicate with one another by, for example, encrypting the messages that they exchange. Thus, the encryption keys used to the encrypt such messages need to managed in a highly secure manner. Accordingly, we provide an encryption module, which, in accord with an aspect of the invention, generates a unique device encryption key ($S_{local}$), a cryptographic key formed from a unique identification key ($S_{id}$) and an associated public key ($KP_{id}$), and at least one program encryption key, in which the public key is generated as a function of the unique identification key. The module (integrated circuit chip) then encrypts the unique identification key and program encryption key using the device encryption key and stores the encrypted result in memory internal to the security module, thereby securing the keys against misappropriation.

In addition, the module provides a mechanism for using the program encryption key to encrypt information that it receives from an external source and store the encrypted information in memory external to the security module, and responsive to receiving from a requester a request for the program encryption key, encrypting the program encryption key, in accord with an aspect of the invention, using a symmetrical encryption key generated as a function of a public key generated by a security module associated with the requester. The former security module then supplies the encrypted program encryption key to the requester.

These and other aspects of the claimed invention will be readily appreciated from the ensuing detailed description, drawings and claims.

DETAILED DESCRIPTION

Figure 1:
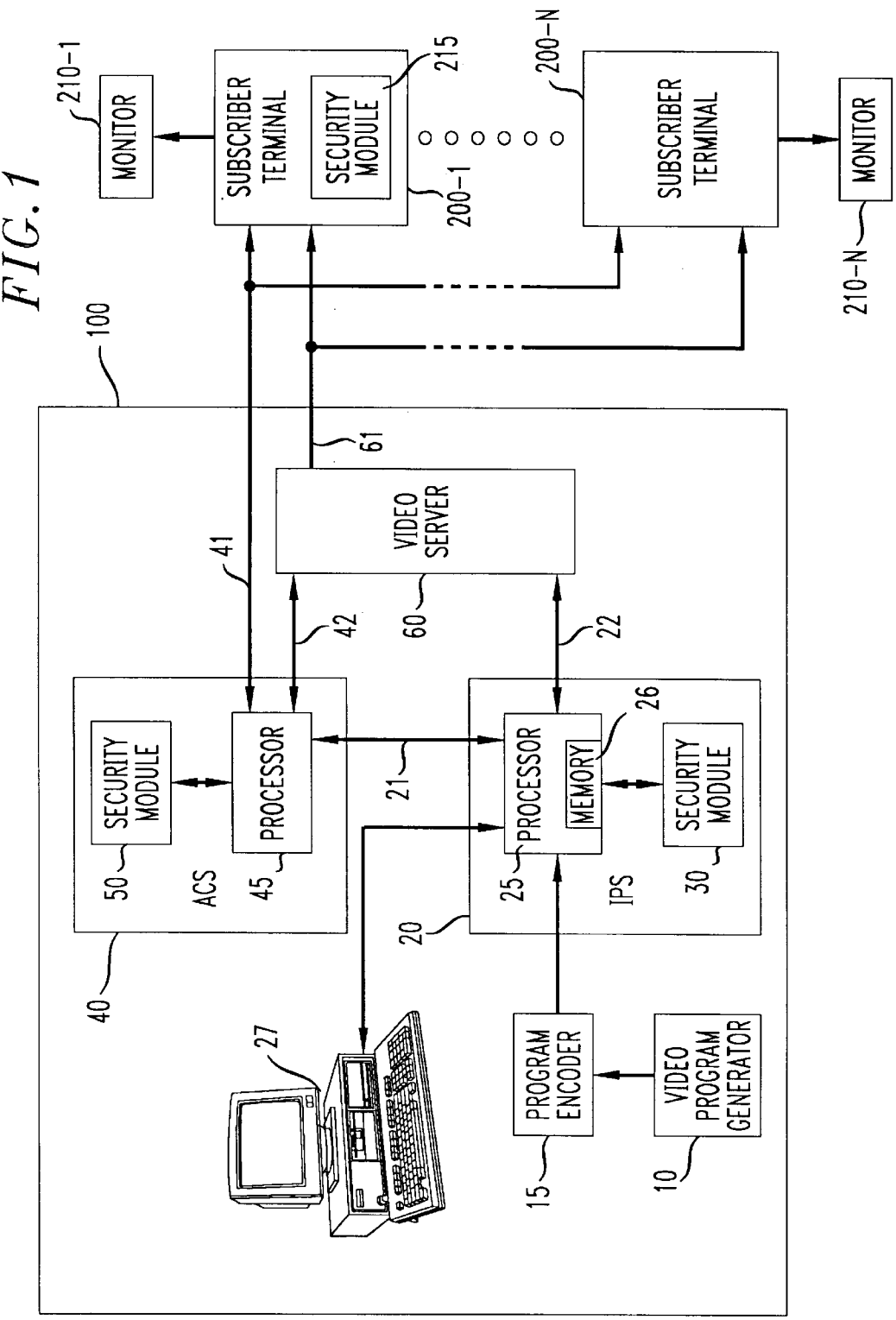
FIG. 1 illustrates in block diagram form a system in which the principles of the invention may be practiced.

An illustrative embodiment of the invention will be discussed in the context of a video information delivery system, such as a so-called Video On Demand (VOD) system. It is understood, of course, that such a discussion is not to be taken as a limitation, since the claimed invention may be practiced in conjunction with different types of data including, for example, financial data, medical data, etc. The claimed invention may be practiced in conjunction with a variety of information delivery systems such as, e.g., facsimile, telephone and other types of data delivery systems.

Specifically, video information delivery system 100 includes, inter alia, video program generator 10, e.g., a conventional VCR, program encoder 15, Information Protection System (IPS) 20, Access Control System (ACS) 40 and video server 60. Program encoder 15, more particularly, converts analog video signals characterizing a particular video program that it receives from video program generator 10 into digital signals. In doing so, program encoder 15 compresses the resulting digital signals in accordance with a predetermined compression scheme, for example, the well-known MPEG-2 encoding scheme. Encoder 15 then supplies the compressed result to IPS 20 via path 16. Processor 25 of IPS 20 receives the compressed information from path 16 and supplies it to head-end security module 30 for encryption using a unique program encryption key that head-end security module 30 priorly generated for that purpose. As such, the unique program encryption key is known only to head-end security module 30. When head-end security module 30 has completed encrypting such information, it then supplies the result to processor 25. (Hereinafter head-end security module will also be referred to as just "security module 30.) Processor 25, in turn, supplies the encrypted information to video server 60 for storage thereat in association with a unique serial number that security module 30 previously generated and associated with the unique program encryption key. Encoder 15, processor 25 and security module 30 cooperate in this manner until a digital version of the video program has been compressed, encrypted and stored in server 60 in association with the aforementioned unique serial number and program identifier.

It is seen from the FIG. that ACS 40 and each subscriber module 200-i contains a security module. Although each such security module is designated differently, e.g., 45, 215, etc., each operates similar to security module 30. Thus, a description of security module 30 equally pertains to the other security modules. With that in mind, the operation of security module 30 includes, inter alia, the generating of a number of unique encryption keys, e.g., respective random numbers, known only to module 30. One of these unique keys is used as a device unique key, also referred to herein as a local storage variable key ($S_{local}$). In accord with an illustrative embodiment of the invention, security module 30 generates such keys responsive to receipt of a command to do so, in which the command is generated by external equipment when module 30 is initially "booted up" as a result of power being applied thereto and a particular command is supplied to module 30. Power is typically first applied to module 30 during a testing phase of the manufacturing process of the module and test commands are being applied thereto. One of those test commands, in accord with an aspect of the invention, may then cause module 30 to generate the aforementioned local storage key, $S_{local}$, and store the key in a secure memory location in local memory, as will be discussed below. Module 30 (also referred to herein as an integrated circuit chip) also generates, in response to the aforementioned command, a second random number that may be used as a private identification key, $S_{id}$, that uniquely identifies the chip/module 30 and also stores the latter key in the secure memory, as will also be discussed below. Also, during the manufacturing/testing phase an externally generated common variable encryption key, $S_{common}$, is supplied to the module, which the module stores in its secure memory. (The purpose and use of the common variable encryption key will be discussed below.)

Security module 30 may associate each of the program encryption keys that it generates with a respective serial number. In addition, security module 30, in accord with an aspect of the invention, encrypts each of the program encryption keys using $S_{local}$ and supplies the result of each such encryption and the associated serial number to processor 25 for storage in memory 26. In an illustrative embodiment of the invention, processor 25 and memory 26 may be the elements of a personal computer or workstation, e.g., an IBM compatible PC system, incorporating security module 30.

Figure 2:
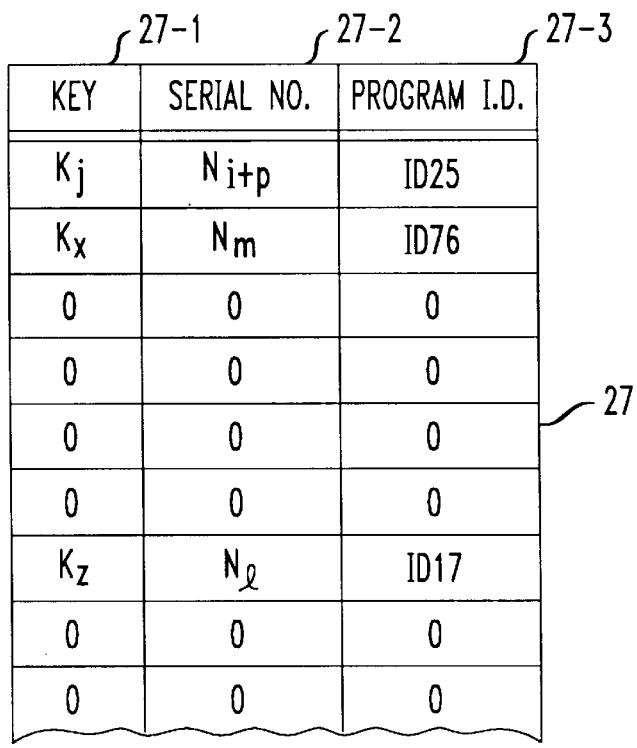
FIGS. 2 and 3 illustrate particular translation tables used by particular elements of FIG. 1, for example, the Information Protection System (IPS) and Access Control System (ACS)

Thereafter, when IPS 20 receives an instruction via path 21 from ACS 40 or user terminal 27 to encrypt a video program that will be received via path 16, then processor 25 unloads one of the encrypted program encryption keys and its associated serial number ("identifier") from memory 26 and supplies the encrypted program encryption key and identifier to security module 30. In addition, processor 25 associates the encryption key and its serial number with an identifier associated with the program to be encrypted, in which the latter identifier may be the name of the program. Specifically, processor 25 maintains a database of encrypted program keys and associated serial numbers in memory 26. Thus, when a program encryption key has been used to encrypt a particular program, then the name (identifier) of that program is also stored in the database in association with the encrypted key and its serial number as shown in FIG. 2.

Briefly, as mentioned above, database 27 may be formed from a segment of memory 26 in which an entry in the database comprises three fields. The three fields include a field 27-1 for storing an encrypted program encryption key, e.g., $k_j$, and for storing the associated serial number, e.g., $N_{i+p}$. When processor 25 assigns an encrypted program encryption key to a program, then processor 25 stores the identity (e.g., title) of the program in field 27-3, e.g., ID25, at the entry containing the associated encryption key, where ID25 represents the identity of the encrypted program.

Continuing and returning to FIG. 1, Security module 30, responsive to receipt of a processor 25 instruction to encrypt a program, uses $S_{local}$ to decrypt the encrypted program encryption key that it received from processor 25. It then stores the result and the associated serial number in secure local memory. Module 30 then, in a conventional manner, encrypts the digital video stream that it receives via path 16 using the decrypted program encryption key and supplies the resulting encrypted video signals to server 60 via processor 25 and path 22 for storage therein in association with the aforementioned serial number and program identifier.

Once a program has been so encrypted and stored in server 60, module 30 communicates with ACS 40 for the purpose of sending the encrypted version of the program encryption key to ACS 40. This is done in a secure manner without ACS 40 having access to the $S_{local}$ that module 30 uses to encrypt the program encryption key. When ACS 40 obtains the program encryption key, then it may thereafter distribute that key in a similar secure manner to a user who has entered a request to review the program and would thus need the program key to decrypt the program for intelligible viewing thereof. To this end, then, ACS 40 and module 30 communicate with one another via processor 25 and a communications channel of path 21 reserved for such communications to transport the "key" to ACS 40.

Specifically, head-end security module 30 and head-end security module 50 are associated with respective so-called cryptographic addresses formed from a public key and a private key. The private key is another device unique encryption key, $S_{id}$, (e.g., a random number) that is also generated during the manufacture of the respective module and stored in a secured/protected memory location, as mentioned above. A security module, e.g., module 30, applies a one-way function to the private key, $S_{id}$, to generate deterministically the public key, $PK_{id}$, (or "public encryption key") as follows:

$$PK_{id}=x^s \bmod p \qquad (1)$$

where exponent S is $S_{id}$, p is a M-bit strong prime (a strong prime p that is known in the art and is acceptable for the instant application is of the form 2q+1 in which q is a prime number), and x is an integer mod p, e.g., a value of two; and where p and x may be system constants. Head-end security modules 30 and 50 may generate their respective public keys, $PK_{id}$, at a time of manufacture and exchange them when they initially communicate with one another. As such, module 30 stores the head-end module 50 $PK_{id}$ in association with the address of head-end module 50 in internal memory (not shown) and head-end module 50 does likewise with the module 30 $PK_{id}$. (It is noted that hereinafter head-end module 50 will also be referred to as module 50.) Modules 30 and 50 may then independently generate a symmetrical encryption key (also "client variable"). That is, module 30 using the module 50 $PK_{id}$ and its own $S_{id}$ may generate the symmetrical encryption key and module 50 using the module 30 $PK_{id}$ and its own $S_{id}$ may also generate the same symmetrical key. In a similar manner, security module 50 and each subscriber security module 215 may share a respective symmetrical key that will be unique to the pair as a result of the $PK_{id}$ associated with a module 215 and a per-use randomly generated key, $Pk_r$, emanating from security module 50. The uniqueness of the latter key is virtually guaranteed by the fact that the private key corresponding to $Pk_r$ is randomly selected from a very large set of possible keys.

Accordingly, security module 30 encrypts the program encryption key using the symmetrical key that it shares with module 50. Security module 30 then inserts the result in a message along with the (a) serial number associated with the program encryption key and (b) identity of the program that was encrypted using that program encryption key. Module 30 also includes in the message a segment of $PK_{id}$ and a conventional authentication code formed by repetitively encrypting $Pk_{id}$ in a conventional manner using $S_{common}$. Module 30 then sends the message to module 50 which uses the authentication code and $PK_{id}$ segment contained in the message to verify that the message was supplied by a valid module 30 (215). That is, module 50 applies its copy of $S_{common}$ to the authentication code and if the result compares with the $Pk_{id}$ segment, then module 50 concludes that the program encryption key in the message was generated by a valid security module. If the comparison fails, then module 50 discards the message. (It is noted that such authentication similarly occurs in conjunction with messages that ACS 40 exchanges with a subscriber terminal 200-$i$.) Assuming that ACS 40 finds that the message is valid, then it uses the symmetrical key that it generated and shares with module 30, to decrypt the encrypted program encryption key contained in the message and then reencrypts the key using its own device unique key $S_{local}$. Module 30 then stores the result along with the associated serial number and program identity as an entry in database 27 (FIG. 2).

A security module, e.g., module 30, generates a shared symmetrical encryption key with another security module, e.g., security module 50, using the following relationship:

$$CV = f(PK_{id}^s \bmod p) \qquad (2a)$$

where CV is the shared symmetrical encryption key to be mutually generated; f is a function that is suited to reducing the number of bits in an associated argument to an amount that complies with the number of bits required by the specific encryption algorithm, (for example, if the modulus p has b bits and the size of the symmetric key is n bits (where b is assumed>n), then f reduces the b bits in the associated argument to n bits, such as by selecting, for example, the first n of the b bits); n is the number of bits in the shared symmetrical encryption key, s is the local module's $S_{id}$ and $Pk_{id}$ is the remote module's public key. For example, security module 30 exponentiates the $Pk_{id}$ that it receives from another security module, e.g., module 50, using the module 30 $S_{id}$. Module 30 then encrypts the CV using its device unique key $S_{local}$ and stores the result in its external memory in association with the address associated with module 50. Module 50 performs a similar process with respect to module 30. Thus, modules 30 and 50 may exchange in a secure manner encryption keys and other encrypted information using their shared symmetrical encryption key (CV). Accordingly, then module 30 encrypts the aforementioned program encryption key using the shared symmetrical key and sends the result to ACS 40 (module 50) via the aforementioned channel. Upon receipt of the latter, module 50 unloads the module 30/50 symmetrical key CV from memory and decrypts the encrypted program encryption key using CV. Module 50 then re-encrypts the program encryption key using its device unique key $S_{local}$ and stores that result, the associated serial number and program identity, as an entry in its own database 27.

Module 30 and 50 interact with each other in the same way to transfer other program encryption keys that module 30 uses to encrypt other programs.

ACS 40 (module 50) similarly interacts with each terminal 200$i$ security module 215 to generate a shared symmetrical key. In this case, however, the CV in module 50 is formed as follows:

$$CV = f(PK_{id}\ r \bmod p) \qquad (2b)$$

where module 50 uses the $Pk_{id}$ associated with the particular subscriber module 215 and exponentiates it using a random number r that module 50 generates. Module 50 also generates a variable (session) key as follows:

$$Pk_v = x^r \bmod p \qquad (2c)$$

which is then transmitted to module 215. Module 215 then forms the shared key CV as follows:

$$CV = f(PK_v^s \bmod p) \qquad (2d)$$

Figure 3:
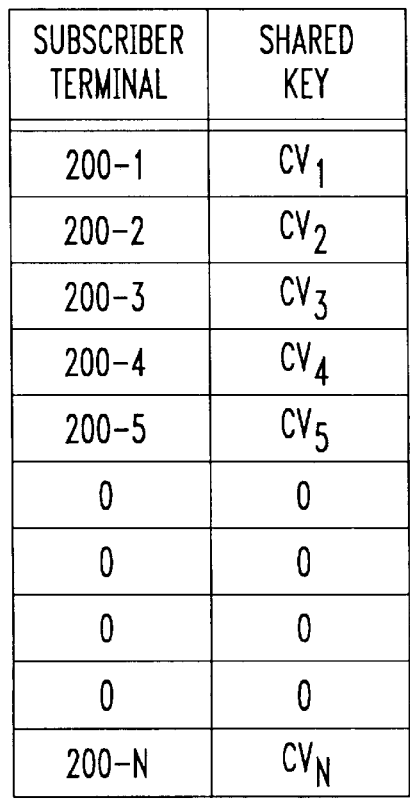

ACS 40, therefore, maintains a database of such symmetrical keys so that a particular shared key may be accessed using the address of the associated subscriber terminal. Specifically, when a subscriber terminal is connected to system bus 41 and system bus 61 and power is applied to the terminal, it then communicates with ACS 40 for the purpose of identifying itself and generating the shared symmetrical key in the manner discussed above. When that task has been completed, then ACS 40 using its $S_{local}$ key encrypts the newly generated symmetrical key that it shares with that terminal and stores the result in its database in association with the address of the latter subscriber terminal. An illustrative example of such a database is shown in FIG. 3. Briefly, database 46 is formed from a plurality of entries comprising a field for the storage of the address of a subscriber terminal and a field for storing the encrypted symmetrical key that ACS 40 shares with that subscriber terminal. Thus, ACS 40 may access a particular shared symmetrical key, e.g., key CV4, as a function of the address of the associated subscriber terminal, e.g., 200-4.

The subscriber terminal security module 215 similarly encrypts the symmetrical key that it shares with ACS 40 using its value of $S_{local}$ and then stores the result in associated memory.

A video program that has been stored in server 60 may be accessed by a subscriber for display on an associated video monitor, e.g., the subscriber associated with terminal 200-1 and monitor 210-1. Since each of the terminals 200$i$ are similar to one another, a discussion of one such terminal, vis-à-vis ordering a program, equally pertains to the other terminals 200$i$. Specifically, subscriber terminal 200-1 may be a so-called "set-top box" having the capability to communicate with the head end of a video subscription system, e.g., ACS 40. The communications that ACS 40 sends via path 41 to the subscriber terminals 200$i$ may include information identifying the programs that a subscriber may access (order). Upon receipt of such information, terminal 200-1 converts the information stream into signals suitable for display on monitor 210-1 for viewing by the associated subscriber. At that point, the subscriber may select (enter a request to order) a program whose name is being displayed on monitor 210-1 by, for example, pointing a screen cursor at the displayed name of the desired program and then operating an associated "enter" button on a device used to control the movement of the screen cursor. Terminal 200-1 in a conventional manner determines which program the screen cursor is pointing to and forms a message containing, inter alia, the name of the selected program and address (serial number) of terminal of 200-1. Terminal 200-1 then transmits the message upstream to ACS 40 via bi-directional communications path 41.

ACS 40, responsive to receipt of the request, reformats the message and supplies it to video server 60 via path 42. In addition, Module 50 accesses its database 46 to obtain a copy of the encrypted CV key that it shares with the requesting terminal and then decrypts the encrypted CV key using its $S_{local}$ key. Module 50 then stores that CV key in its key cache memory. Processor 40 then unloads the encrypted program encryption key used to encrypt the requested program from its own database 27 and supplies the latter key to module 50. Module 50 using its $S_{local}$ key decrypts the encrypted program encryption key and then re-encrypts that key using the shared symmetrical key that it stored in its associated register. Module 50 then supplies the result to processor 45, which, in turn, forms a message containing that result, the address of the requesting subscriber terminal as the destination and address of ACS 40 as originator. Processor 45 then transmits the message over bus 41 for distribution to the subscriber terminals 200$i$. Since bus 41 is a broadcast bus, each of the terminals 200$i$ receive the message, but only the terminal whose address is contained in the message reads the message into its processing unit (not shown). The latter subscriber terminal stores the program encryption key, which is still protected by the key shared with ACS 40, in memory until the associated user enters signals (e.g., by using a remote control device, such as an infrared VCR control device) requesting the playing of the associated encrypted video program. At that time, the entered request is supplied to video server 60. The subscriber terminal also unloads the associated program encryption key from its memory and supplies it to security module 215. Security module 215, in turn, unloads its encryption CV key that it shares with ACS 40 (security module 50), decrypts the key using its $S_{local}$ and then using the decrypted shared key decrypts the program key associated with the program requested by the subscriber. Security module 215 then stores the decrypted program key in its key cache memory (shown below), where it is made readily available for use in decrypting the associated encrypted program when it is received from server 60.

Video server 60, in turn, unloads a segment of the requested movie that is stored in its internal memory (not shown), forms a message containing the identity of the program (program id), address of the requesting terminal as the destination, address of server 60 as the originator and respective program segment as the message payload. Server 60 then transmits the message in sequence with other such messages to communications path 61 for transmission to the subscriber terminals. Server 60 continues to operate in that manner until it has unloaded the last segment forming the requested program/movie and supplied it to path 61. When the subscriber terminals receive a message via path 61 only the terminal whose address is contained in the message "reads in" the message and supplies the contents of the message information field to its associated security module 215 for decryption. Module 215, in turn, (a) locates the program id in the message, (b) associates that id with the proper key-cache memory location, (c) unloads the program encryption key stored at that memory location, (d) uses the key to decrypt the program segment contained in the received message, and (e) supplies the result to the video elements of the subscriber terminal for display on the associated video monitor, e.g., monitor 210-1. The security module 215 continues to operate in that manner until the last of the program segments has been received from server 60, decrypted and displayed.

As mentioned above, a security module passes its unique private identification key through a so-called one-way function to generate a public key, $PK_{id}$. In accord with an aspect of the invention, the public key may also be used as a serial number to externally identify the chip/module that generated the public key. Specifically, at the time that the chip/module 30 generates its public key, e.g., during the manufacturing/testing phase, another command may be supplied to the chip requesting the chip to output its public key for registration as a serial number in a database. Thus, in accord with an aspect of the invention, the module 30 generates and outputs its own serial number, rather than the serial number being externally generated and associated with the module. If the chip/module is thereafter misplaced, e.g., stolen, but is, nevertheless, eventually plugged into a subscriber terminal, then when that terminal is used to request a copy of a video program stored in server 60, then ACS 40 may compare the serial number contained in the request message with a list a serial numbers associated with respective security module that have been so misplaced. If that serial number is contained in the list then ACS 40 may discard the message or take some other action, e.g., notifying the service provider.

Figure 4:
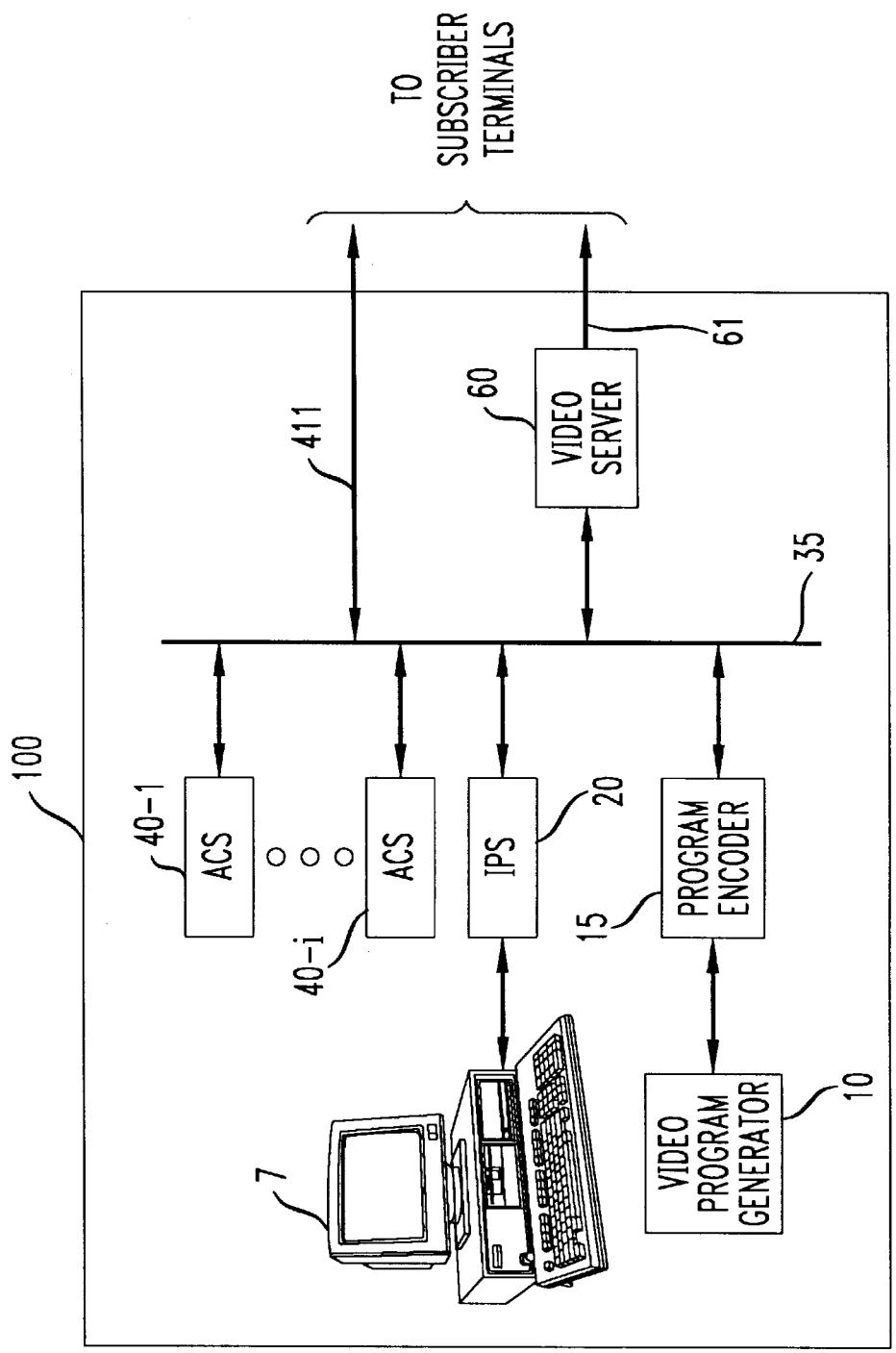
FIG. 4 is another illustrative embodiment of the information delivery system of FIG. 1.

FIG. 4 illustrates an alternative embodiment of information delivery system 100 employing redundant Access Control Systems 40-1 through 40-$i$, where i may be, for example, the number four. One such ACS 40$i$, e.g., ACS 40-1, is made the active ACS and the others, e.g., ACS 40-2 through 40-$i$, are set to a standby mode, in which one of the standby ACSs, e.g., ACS 40$i$, is made active whenever the active ACS is taken out of service. It is seen that the various elements that form system 100 now communicate with one another via a conventional bus system 35, for example, a conventional local area network (LAN) that also interfaces with bus 41 extending to subscriber terminals 200. Except for communicating over bus 35, program generator 10, program encoder 15, video server 60 and ACS 40$i$ of FIG. 5 operate in the manner discussed above. This is also the case for IPS 20, except that IPS 20 now communicates with a plurality of redundant ACSs 40$i$ and shares a respective symmetrical key CV with each such ACS for the purpose of supplying program encryption keys thereto. IPS 20, more particularly, generates a symmetrical key CV for each ACS 40$i$ using the $PK_{id}$ supplied by that ACS and equation 2 as discussed above. IPS 20 then encrypts the CV using its $S_{local}$ and stores the encrypted CV in internal memory (not shown) in association with the address for that ACS 40$i$, as also discussed above. Then 20 supplies a program encryption key with the active ACS, in which the program key is encrypted using the CV that IPS 20 shares with the active ACS. Similarly, IPS 20 also supplies the key to each of the standby ACSs, in which the program key is encrypted using the CV that the IPS 20 shares with that standby. In this way, the contents of the aforementioned databases maintained by the standby ACSs track the contents of the databases maintained by the active ACS. Accordingly, if the active ACS is taken out of service, or set to a standby mode, for whatever reason, then one of the other standby ACSs may be set to the active mode.

Figure 5:
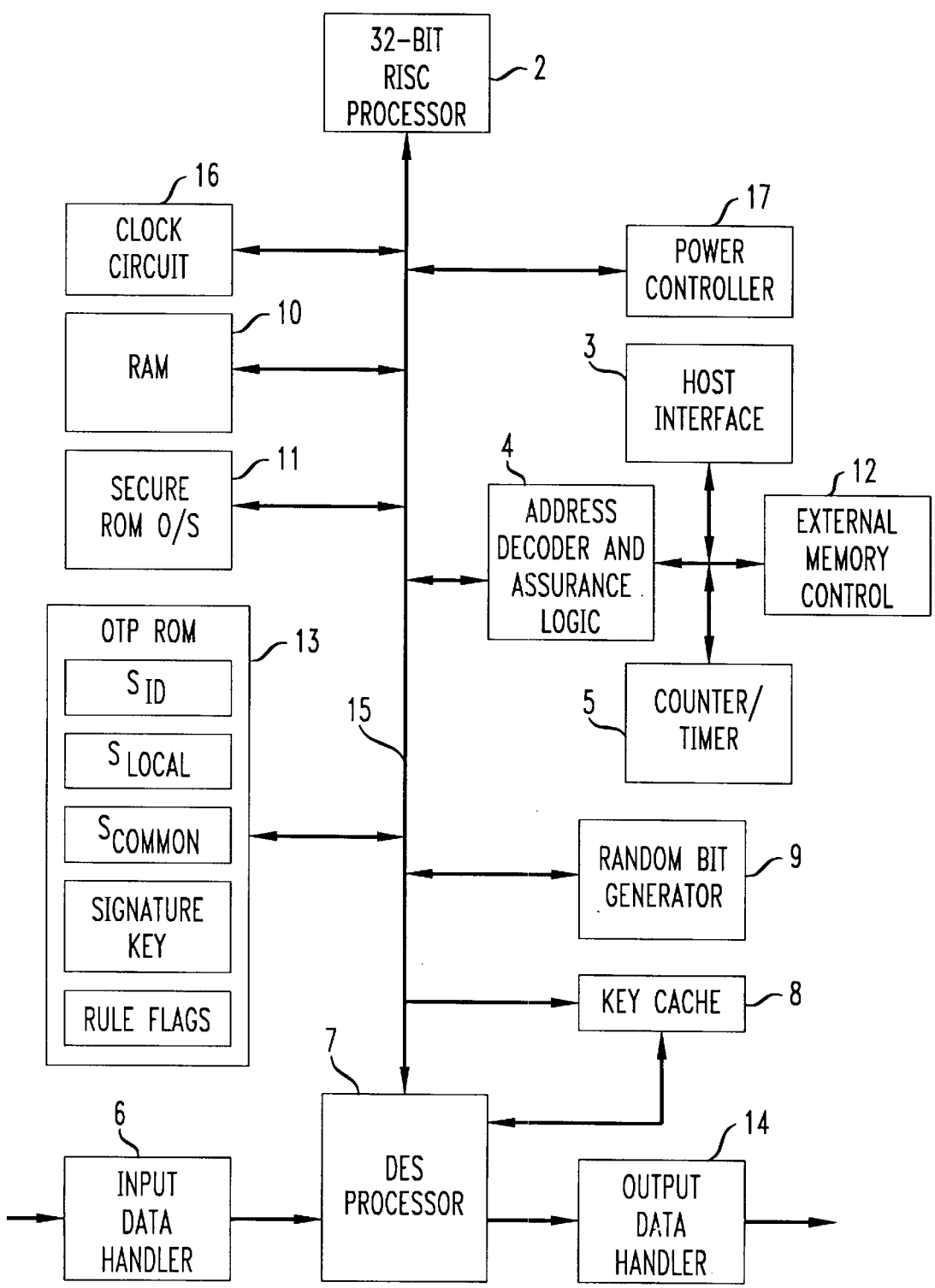
FIG. 5 is a block diagram of the security module chip of FIG. 1.

A more detailed block diagram of the security module which implements the foregoing is shown in FIG. 5. Specifically, the security module, which may be, for example, the VM06868 high-speed encryption engine commercially available from VLSI Technology, Inc., San Jose, Calif., U.S.A., includes a conventional clock circuit 16, 32-bit Reduced Instruction Set (RISC) processor 2, host interface 3, assurance logic 4, counter/timer 5, key cache 8, random bit generator 9, secure RAM memory 10, secure ROM memory 11, external memory control circuit 12, One-Time-Programmable Rom circuit 13, power controller 15 and Digital Encryption System (DES) processor 7. The security module also includes an input data handler 6 and output data handler 14 respectively connecting to DES processor 7. It is seen from the FIG. that a majority of the elements forming the security module are interconnected via system bus 15.

Briefly, RISC processor 2, controls the overall operation of the security module and also performs data handling and processing of cryptographic functions. It includes a multibit bus, e.g., a 32-bit bus, which allows instructions to be stored in a single memory. These instructions may be fetched via a three stage data pipeline so that processing can operate continuously. That is, while one instruction is being executed, the next instruction may be decoded and the second next instruction may be fetched from memory. When a reset occurs, processor 2 begins to execute code that is stored in internal ROM. At that point, the input and output data handlers are disabled including various control leads, such as select leads. Processor 2 then executes a self-test routine. At the completion of the self-test, processor 2 checks the contents of OTP ROM 13 to determine if the various unique encryption keys have been generated and stored in ROM 13. If not, then processor 2 directs random-bit generator 9 and DES processor 7 to generate the unique encryption keys, and stores the keys in ROM 13. DES processor 7, in turn, generates the required keys for storage in ROM 13, in which each of the generated keys is a random number formed from randomly generated bits and then outputted, in which the key generation process is not a perfect random statistic. Processor 7 supplies each key to processor 2, which further processes the key to improve the statistical characteristic of the bit stream using a conventional compression scheme. Processor 2 then stores the keys in ROM 13 and stores the program encryption keys in key cache 8 via bus 15.

It is seen that DES processor 7 has direct access to key cache 8 and uses such access to obtain a key from the cache to encrypt incoming data that is received via input data handler 6. Specifically, responsive to receipt of an instruction from processor 2 to encrypt data using an identified program encryption key, processor 7 accesses cache 8 using such identity (e.g., a memory location address) unloads a copy of the identified program encryption key and encrypts the data as it is received via handler 6 using the selected program encryption key. Processor 7 then outputs the encrypted data via output data handler 12.

If the keys have already been generated (or after they have been generated), then processor 2 enables the data handlers and control leads. Processor 2 then begins executing external program code supplied via external memory control 12 and assurance logic 4. That is, assurance logic 4 provides an interface between bus 15 and external circuits to prevent external access to the processing capability of the security module and the various encryption keys that it generates. Likewise, host interface 3 provides a simple bus interface having dual-port FIFOs with associated control logic. Interface 3 therefore provides an interface between an external bus extending to a host computer and bus 15 and does so via assurance logic 4.

Address decoder 4 provides all select functions for all of the peripheral circuits that are internal and external to the security module. Three of the most significant bits (MSB) of the module address are used to implement this function.

Input data handler 6 includes an input register file configured as a FIFO, register, byte counters and a multibit, e.g., 32 bit, multiplexer. It is also configured as a packet counter, idle detect logic and bus interface. Data handler 6, inter alia, receives byte-wide data from a so-called transport chip and formats the data into 32 bit words for either processor 2 or output data handler 14. Output data handler (ODH) 14 performs a somewhat opposite function. That is, ODH 14, inter alia, receives 32-bit data from processor 2, reformats the data and outputs byte-wide data externally to the transport chip. ODH 13 includes a Select Status register, four 32-bit data registers, a 32-to-8 bit converter connected to a 40-byte deep FIFO. Similar to IDH 6, the data registers are grouped together to form two 64-bit register banks. This data is written as 32-bit words but is output to the FIFO in byte format. ODH 14 can store up to 56 bytes of data (two 64-bit register banks and a 40-byte FIFO, and RESET input resynchronizes the operation of the FIFO. ODH 14 is controlled by processor 2 for read and write I/O operations. Processor 2 may access ODH 14 by asserting as so-called /CS lead and writing data to the ODH 14 register banks.

The foregoing is merely illustrative of the principles of the invention. Those skilled in the art will be able to devise numerous arrangements, which, although not explicitly shown or described herein, nevertheless embody those principles that are within the spirit and scope of the invention. For example, a software process may be readily substituted for the DES processor shown in FIG. 5.

The invention claimed is:

1. An information delivery system comprising
an access control system,
an information protection system, and
a plurality of subscriber terminals, wherein said access control system, said information protection system and said plurality of subscriber terminals each include a security module formed on an integrated circuit chip, said security module comprising
generator comprising means, responsive to receipt of particular stimuli via an input terminal, for generating at least a unique serial number ($S_{id}$) that is thereafter directly used to uniquely identify the security module and for generating a public key ($KP_{id}$) as a function of said unique serial number, said generator further comprising;
means for generating a symmetrical encryption key as a function of said unique serial number and a public key associated with and generated by another security module,
means, responsive to receipt of an encrypted program encryption key from said other security module for decrypting said encrypted program encryption key using said symmetrical key,
means for generating a device unique key ($S_{local}$) and said program encryption key, and
means for encrypting at least said serial number and said program encryption key using said device unique key and storing the encrypted results in memory internal to the integrated circuit.

2. The system of claim 1 wherein said memory associated with said security module is external to the integrated circuit and wherein the integrated circuit further comprises means for associating said program encryption key with an identifier and storing the identifier in said external memory in association with the encrypted version of said program encryption key.

3. The system of claim 1 wherein said access control system includes said information protection system.

4. An integrated circuit chip comprising
means, responsive to particular stimuli, for generating at least a unique device encryption key ($S_{local}$), a unique identification key ($S_{id}$) that is thereafter directly used to uniquely identify the integrated circuit chip and an associated public key ($KP_{id}$), and at least one program encryption key, said public key being generated as a function of said unique identification key, means for encrypting the unique identification key and said at least one program encryption key using said device encryption key and storing the encrypted results in memory internal to the integrated circuit, and means, responsive to receiving from a requester a request for said at least one program encryption key, for encrypting at least one program encryption key using a symmetrical key generated as a function of (a) a public key generated by a security module associated with the requester, and (b) said unique identification key, and supplying the encrypted at least one program encryption key to the requester.

5. The integrated circuit chip of claim 4 further comprising means, responsive to receipt of an indication to encrypt particular information, for retrieving said encrypted at least one program encryption key from said internal memory and decrypting that key using said device unique key, and means for encrypting particular information as it is received using the decrypted program encryption key and stores the encrypted particular information in external memory.

6. The integrated circuit chip of claim 5 wherein said external memory is contained in a data server.

7. The integrated circuit chip of claim 5 wherein said encrypted program encryption key is sent to the requester in a message containing the public key ($PK_{id}$) that the sending security module generated.

8. The integrated circuit chip of claim 5 further comprising for causing the integrated circuit to send to the requester (a) the generated public key ($KP_{id}$), (b) the encrypted at least one program encryption key and (c) an authentication code derived as a function of the generated public key and an encryption key ($S_{common}$) common to each said integrated circuit.

9. The integrated circuit chip of claim 4 wherein said unique device encryption key ($S_{local}$) is known only to said integrated circuit chip.

10. The integrated circuit chip of claim 4 wherein said public key ($PK_{id}$) is shared with an external device.

11. A method of operating a security module, formed on an integrated circuit chips said security module performing the steps comprising:

responsive to particular stimuli, generating a unique device encryption key ($S_{local}$), a unique identification key ($S_{id}$) that is used directly thereafter to uniquely identify the integrated circuit chip and an associated public key ($PK_{id}$), and at least one program encryption key, said public key being generated as a function of said unique identification key, encrypting said unique identification key and said at least one program encryption key using said device encryption key and storing the encrypted result in memory internal to said security module, encrypting particular information using said at least one program encryption key and storing the encrypted particular information in memory external to said security module, and responsive to receiving from a requester a request for said at least one program encryption key, encrypting said at least one program encryption key using a symmetrical key generated as a function of said unique identification key and a public key generated by a security module associated with the requester and supplying the encrypted at least one program encryption key to the requester.

12. The method of claim 11 further comprising the steps of responsive to receipt of an indication to encrypt said particular information, retrieving said encrypted at least one program encryption key from said internal memory and decrypting the encrypted at least one program encryption key using said device unique key, and encrypting said particular information as it is received using the decrypted program encryption key and storing the encrypted particular information in said external memory.

13. The method of claim 12 wherein said external memory is contained in a data server.

14. The method of claim 11 further comprising the step of causing said security module to also send to the requester (a) a segment of said associated public key ($PK_{id}$), (b) said encrypted at least one program encryption key and (c) an authentication value derived as a function of said segment of said associated public key ($PK_{id}$).

* * * * *